April 29, 1941.   R. G. HOFFERT   2,239,964
AUTOMATIC CLUTCH FOR WIRE STITCHING MACHINES
Filed July 12, 1940
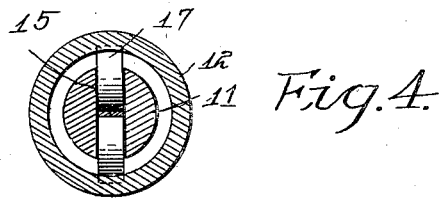
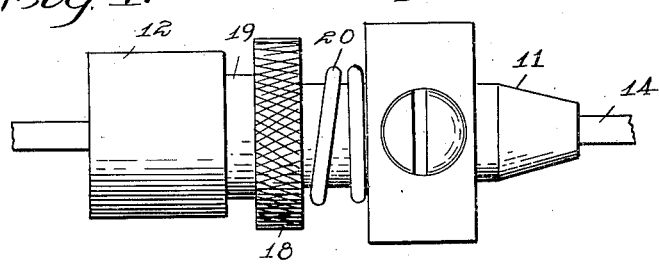
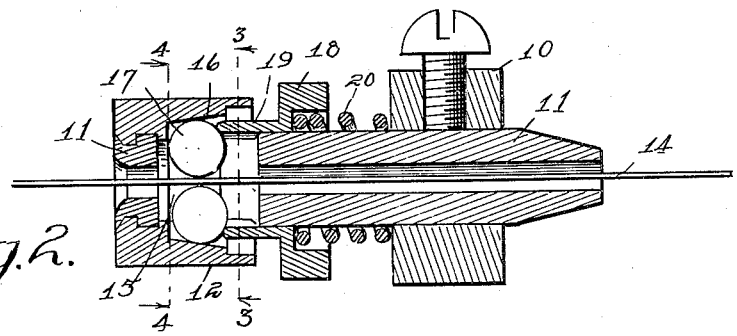
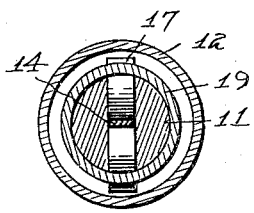
Inventor
Roy G. Hoffert
by Orwig & Hague
Atty's Patented Apr. 29, 1941

2,239,964

UNITED STATES PATENT OFFICE 2,239,964

AUTOMATIC CLUTCH FOR WIRE STITCHING MACHINES

Roy G. Hoffert, Racine, Wis.

Application July 12, 1940, Serial No. 345,158

1 Claim. (Cl. 140—130)

My invention relates to the art of wire stitching or stapling machines. In machines of this class it is customary to have a wire feeder head which is reciprocated vertically, and during the downward stroke the wire is forcibly moved downwardly for stitching or stapling purposes, and during the up stroke the wire is released and again gripped at the end of the up stroke.

The object of my present invention is to provide an automatic wire-gripping device of simple, durable and inexpensive construction which will automatically grip and release the wire under all conditions of actual use.

In the accompanying drawing—

Figure 1 shows a top view of my improved wire clutch device;

Figure 2 shows a vertical central sectional view of same with a stitching wire in position therein;

Figure 3 shows a sectional view on the line 3—3 of Figure 2; and

Figure 4 shows a sectional view on the line 4—4 of Figure 2.

The wire feeder head is indicated by the reference numeral 10. This head is intended to be reciprocated by the stitching machine to which it is applied.

Detachably mounted in the wire feeder head is the tubular wire guiding body 11 having at one end the disc clutch body 12. The longitudinal central opening 13 through said device is of a size to freely admit the stitching wire 14 which in the form shown has flat sides.

A recess or chamber for receiving the clutch discs is formed in the tubular body 11. It is extended transversely through the body, open at both sides of the body, and has flat parallel sides 15. The disc clutch body 12 is fixed to one end of the tube 11 and its inner wall is tapered at 16.

Mounted within this recess are the disc clutches 17. These discs have flat parallel sides loosely fitted against the flat parallel sides 15 of the recess, thereby permitting the disc clutches to rotate and move toward and from the body 11, but preventing any axial tilting movement thereof. The axial length of the discs is preferably substantially the same as the maximum diameter of the stitching wire.

For the purpose of automatically moving the clutch discs to wire-clutching position I have mounted upon the tubular wire-guiding body a collar 18 having a circular flange 19 to engage the outer portions of the peripheries of the clutch discs, as shown in Fig. 2. An expansible coil spring 20 between the head 10 and the collar 18 yieldingly holds the collar toward the discs.

In practice I have demonstrated that my improved clutch device positively clutches the wire and releases it under all of the conditions of ordinary use. The thin flat discs may be cheaply and easily made with parallel sides and a circular periphery, and when placed in the recess all axial movement of the discs is prevented and also all axial tilting movement is prevented. Furthermore, the flat tapered portions at the ends of the recess engage the flat peripheries of the clutch discs diametrically opposite from the points where the clutch discs engage the wire, hence, the gripping pressure is applied through straight lines through the maximum diameter of the discs. When the wire feeder head moves toward the right, as shown in Fig. 2, the clutch discs are forced into clutching position by the spring and tapered ends of the recess, and when it moves in the other direction the frictional resistance of the discs upon the wire overcomes the pressure of the spring and permits the clutch discs to move to releasing position.

I claim as my invention:

An automatic clutch for wire stitching machines, comprising a head to be reciprocated, a wire guiding tube fixed to the head and formed with a longitudinal opening for admitting a stitching wire and also formed with a chamber or recess for receiving clutch discs, said chamber or recess being extended transversely and open at both ends and having flat parallel sides, a clutch disc operating body fixed to the tubular body and being formed with an inner side wall tapered outwardly and toward the head, two clutch discs mounted in said recess and having flat sides loosely engaging the parallel sides of the disc chamber or recess and being of such size and shape as to be engaged by the said tapered wall, the thickness of the discs being substantially the same as the maximum diameter of the wire to be engaged thereby, a collar slidingly mounted on the tubular body and having a circular flange to engage the peripheries of the discs at points diametrically opposite those portions of the discs which engage the wire, and a spring for forcing the collar into engagement with the discs.

ROY G. HOFFERT.